(12) United States Patent
Furuta

(10) Patent No.: US 7,442,668 B2
(45) Date of Patent: Oct. 28, 2008

(54) SOLID ACID CATALYST CONTAINING TIN AND METHOD FOR PREPARATION THEREOF

(75) Inventor: Satoshi Furuta, Toda (JP)

(73) Assignee: Japan Energy Corporation, Tokyo (JP)

(*) Notice: Subject to any disclaimer, the term of this patent is extended or adjusted under 35 U.S.C. 154(b) by 303 days.

(21) Appl. No.: 10/550,716

(22) PCT Filed: Apr. 21, 2004

(86) PCT No.: PCT/JP2004/005720

§ 371 (c)(1),
(2), (4) Date: Sep. 23, 2005

(87) PCT Pub. No.: WO2004/094058

PCT Pub. Date: Nov. 4, 2004

(65) Prior Publication Data

US 2007/0004590 A1 Jan. 4, 2007

(30) Foreign Application Priority Data

Apr. 23, 2003 (JP) ............................ 2003-117891

(51) Int. Cl.
B01J 27/02 (2006.01)
C01G 17/02 (2006.01)
C01G 19/02 (2006.01)
C01G 21/02 (2006.01)

(52) U.S. Cl. .................. 502/216; 423/594.9; 423/618
(58) Field of Classification Search ................ 502/216; 423/594.9, 618
See application file for complete search history.

(56) References Cited

U.S. PATENT DOCUMENTS 1,529,261 A * 3/1925 Lubowsky ................. 423/618

(Continued)

FOREIGN PATENT DOCUMENTS

JP 59-182229 * 10/1984

(Continued)

OTHER PUBLICATIONS

"Catalytic action of sulfated tin oxide for etherification and exterification in comparison with sulfated zirconia," Satoshi Furuta et al. Applied Catalysis A: General 269 Aug. 18, 2004, pp. 187-191.*

(Continued)

Primary Examiner—Jerry Lorengo
Assistant Examiner—Patricia L Hailey
(74) Attorney, Agent, or Firm—Flynn, Thiel, Boutell & Tanis, P.C.

(57) ABSTRACT

An object is to provide a sulfated tin oxide catalyst with strong catalytic activity, and a method for preparation thereof. It was discovered that in the preparation of a solid acid catalyst containing tin, stronger solid acid properties than before could be achieved by preparing a support comprising a crystalline tin oxide, preferably metastannic acid, bringing this support into contact with organic acid ions, then bringing it into contact with a sulfate group-containing compound, and then calcining it. The solid acid catalyst of the present invention has a tin content of 30% or more by weight as metal in the catalyst, a sulfate group supported thereon and an argon adsorption heat of more than 30 kJ/mol, and is used in acid-catalytic reactions.

3 Claims, 2 Drawing Sheets

U.S. PATENT DOCUMENTS

| | | | | |
|---|---|---|---|---|
| 4,041,144 | A | * | 8/1977 | Obara et al. ................. 423/618 |
| 4,048,294 | A | * | 9/1977 | Gloskey et al. ............. 423/618 |
| 4,208,537 | A | * | 6/1980 | Kawamata et al. .......... 568/804 |
| 4,478,812 | A | * | 10/1984 | Lane .......................... 423/618 |
| 5,652,192 | A | * | 7/1997 | Matson et al. ............... 502/304 |
| 6,376,701 | B1 | | 4/2002 | Chavan et al. |
| 7,211,681 | B2 | * | 5/2007 | Furuta ........................ 554/174 |

FOREIGN PATENT DOCUMENTS

JP               9-75735           3/1997

OTHER PUBLICATIONS

"Biodiesel fuel production with solid amorphous-zirconia catalysis in fixed bed reactor," Satoshi Furuta et al. Biomass and Bioenergy 30 Jul. 7, 2006, pp. 870-873.*

"Solid Catalyst treated with Anion XIX: Synthesis of the Solid Superacid Catalyst of Tin Oxide treated with Sulfate Ion," Hiromi Matsuhashi et al. Applied Catalysis, 59 (1990), pp. 205-212.*

"Catalytic action of sulfated tin oxide for etherification and esterification in comparison with sulfated zirconia," Satoshi Furuta et al. Applied Catalysis A: General 269 (2004), pp. 187-191.*

"Surface characterization and catalytic activity of sulfated tin oxide catalyst," A. S. Khder et al. Catalysis Communications 9 (2008), pp. 769-777.*

"meta-Stannic acid as an effective support for the preparation of sulfated and tungstated stannias," Makoto Hino et al. Applied Catalysis A: General 321 (2007), pp. 147-154.*

Transition metal oxides additivated with sulphate or phosphate as catalysts for the cracking of cumene and supports for sulphided nickel-tungsten hydrocracking catalysts, by A. C. B. dosSantos et al, *Applied Catalysts A: General, Elsevier Science,* , vol. 153, 1997, pp. 83-101.

Finely Dispersed Iron, Iron-Molybdenum, and Sulfated Iron Oxides as Catalysts for Coprocessing Reactions, by V.R. Pradhan et al, *Energy & Fuels*, vol. 5, No. 5, 1991, pp. 712-720.

Hiromi Matsuhashi, "Preparation of a Solid Superacid of Sulfated Tin Oxide with Acidity Higher Than That of Sulfated Zirconia and Its Applications to Aldol Condensation and Benzoylation", Chem. Mater., 2001, vol. 13, No. 9, pp. 3038 to 3042.

* cited by examiner

SOLID ACID CATALYST CONTAINING TIN AND METHOD FOR PREPARATION THEREOF

TECHNICAL FIELD

The present invention relates to a solid acid catalyst having a sulfate group supported on tin oxide, and to a method for preparation thereof. Such a solid acid catalyst is useful in acid-catalytic reactions such as transesterification reactions and esterification reactions.

BACKGROUND ART

Sulfated zirconia catalysts having a sulfate group supported on zirconium oxide are popular as solid acid catalysts because of their high level of activity. Recently a sulfated tin oxide catalyst having a sulfate group supported on tin oxide has been reported to be more active than sulfated zirconia catalysts (H. Matsuhashi et al, *Chem. Mater.* 2001 Vol. 13, pp. 3038-3042).

DISCLOSURE OF THE INVENTION

It is an object of the present invention to provide a method for preparing a sulfated tin oxide catalyst with even stronger catalytic activity.

The inventors discovered that in preparing a solid acid catalyst containing tin, stronger solid acid properties than before could be achieved by preparing a support comprising a crystalline tin oxide, preferably metastannic acid, bringing that support into contact with organic acid ions, then bringing it into contact with a sulfate group-containing compound, and then calcining it.

The solid acid catalyst of the present invention preferably has a tin content of 30% or more by weight as metal in the catalyst, a sulfate group supported thereon, and an absolute value of argon adsorption heat of 30 kJ/mol or more, and is used in acid-catalytic reactions. In the infrared reflection spectrum of the catalyst, reflectance at 1280 $cm^{-1}$ is preferably lower than reflectance at 1220 $cm^{-1}$. In the ultraviolet reflection spectrum of the catalyst, reflectance at 450 nm is preferably 80% or more.

BEST MODE FOR CARRYING OUT THE INVENTION

Support

Figure 1:
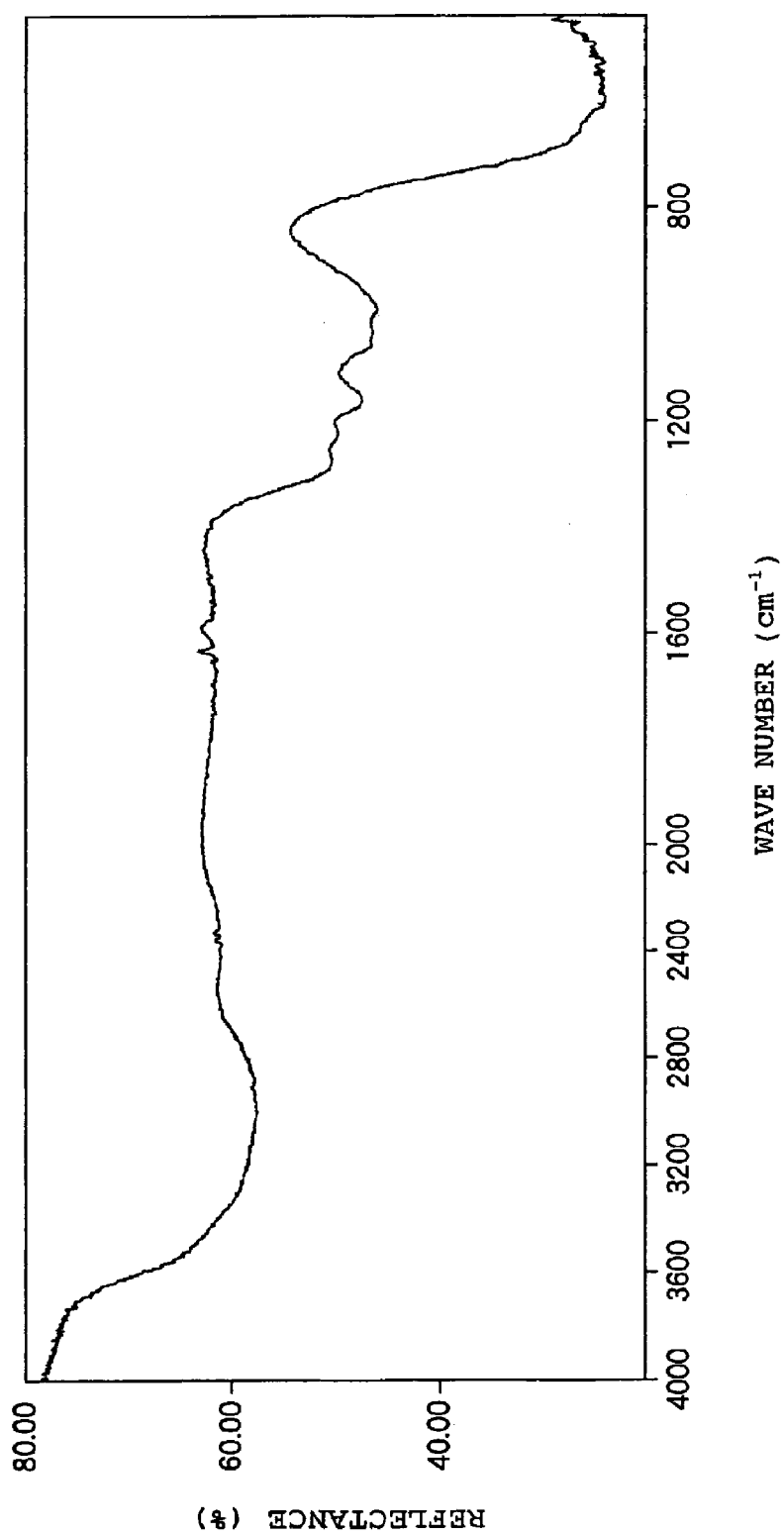
FIG. 1 shows the infrared reflection spectrum of the sulfated tin oxide catalyst MO-858.

The support comprises a crystalline tin oxide, preferably metastannic acid. The support may be either powdered or shaped, or may consist of a tin oxide formed on the surface of a support consisting of a component other than tin oxide. Any form of tin oxide can be used as long as it is crystalline rather than amorphous, and stannous oxide or stannic oxide can be used, but metastannic acid is particularly desirable. Metastannic acid is produced by applying concentrated nitric acid to tin ore, and washing the result. It preferably consists of an oxide having an effectively tetragonal crystal structure. This can be confirmed by powder x-ray diffraction, and specifically by the diffraction peak at $2\theta=26.6°$ (CuKα radiation). The tin oxide may be a hydrated oxide.

Contact with Organic Acid

Before being brought into contact with the sulfate group-containing compound, the surface of the tin oxide is preferably pre-treated with organic acid ions, particularly a solution, preferably an aqueous solution, of carboxylic acid ions. The carboxylic acid ions preferably have 1 to 3 carbon atoms. Desirable examples of such aqueous solutions include aqueous solutions of ammonium acetate and other carboxylic acid ammonium salts and carboxylic acid metal salts such as sodium salts and potassium salts.

Contact with the organic acid ions normally takes place at a temperature of 10 to 80° C. or preferably 15 to 40° C. for 0.1 to 10 hours. The concentration of organic acid ions when used in solution is 1% by mass or more or preferably 3 to 50% by mass.

Contact with Sulfate Group-Containing Compound

The sulfate group-containing compound is a compound containing a sulfate component or a compound containing a sulfur component which can be converted to a sulfate component by subsequent calcining or other treatment, and examples of sulfate group-containing compounds include sulfuric acid, ammonium sulfate, sulfurous acid, ammonium sulfite, thionyl chloride, dimethyl sulfate and the like. Normally the sulfate group-containing compound is brought into contact with the tin oxide using a solution such as an aqueous solution.

Contact with the sulfate group-containing compound normally takes place at 10 to 80° C., preferably 15 to 40° C. for 0.1 to 10 hours. The concentration of the sulfate group-containing compound when used in solution is 10% by mass or more, preferably 20 to 98% by mass. After contact with the organic acid ions the tin oxide may be either dried or not dried before being brought into contact with the sulfate group-containing compound.

Calcining

Calcining is performed in air or a nitrogen or other gas atmosphere, and is preferably performed in air. The calcining temperature differs depending on the calcining time, gas flow rate and other calcining conditions but is normally 300° to 900° C., preferably 400° to 800° C. The calcining time differs depending on the gas flow rate and other calcining conditions but is normally 0.05 to 20 hours, preferably 0.1 to 10 hours, more preferably 0.2 to 5 hours. Calcining may be preceded by drying at 50 to 200° C.

Solid Acid Catalyst

The solid acid catalyst of the present invention comprises a tin oxide component and contains a sulfate component. The metal oxide is defined so as to include hydrated metal oxides. The tin oxide component is preferably substantially composed of tin oxide having a tetragonal crystal structure. Preferably the catalyst contains tin oxide in an amount of 20 to 72% by weight, more preferably 30 to 72% by weight, in terms of weight of elemental tin. The tin oxide is crystallized to a degree that can be confirmed by the diffraction peak, with a crystallite size of preferably 10 to 50 nm or more preferably 20 to 45 nm. The specific surface area of the catalyst is 100 $m^2/g$ or more or preferably 100 to 200 $m^2/g$.

The proportion of the sulfate component is 0.7 to 10% by weight, preferably 1 to 9% by weight, more preferably 2 to 8% by weight, as elemental sulfur weight. Too much or too little sulfate component detracts from catalytic activity.

A desirable property of the solid acid is a Hammett acidity function $H_0$ of −14 or less, preferably −16 or less. The argon adsorption heat is preferably −20 kJ/mol or less, more preferably −30 kJ/mol or less, still more preferably −30 to −60 kJ/mol. This argon adsorption heat is the adsorption amount measured by means of a volumetrical method when argon is introduced at the temperature of liquid nitrogen after the object being measured has been heated to 300° C. while being exhausted in vacuum, as disclosed in detail in *J. Phys. Chem.* B, Vol. 105, No. 40, p. 9667 (2001). The solid acid catalyst of the present invention is also characterized in that reflectance at 1280 cm$^{-1}$ is less than reflectance at 1220 cm$^{-1}$ in the infrared reflection spectrum. The solid acid catalyst of the present invention is also characterized by being white and specifically by having a reflectance at 450 nm of 80% or more in the ultraviolet reflection spectrum.

Acid-Catalytic Reactions

The solid acid catalyst of the present invention is useful in acid-catalytic reactions.

It can be used in acid-catalytic reactions in which Lewis acid catalysts, typically aluminum chloride based catalysts, and BrØnsted acid catalysts, typically sulfuric acid, are conventionally used. Examples of such reactions include isomerization, disproportionation, nitration, decomposition, alkylation, esterification, transesterification, acylation, etherification, polymerization and the like. In particular, the solid acid catalyst of the present invention is used favorably in transesterification, esterification and etherification reactions.

Transesterification Reaction

A transesterification reaction is accomplished by bringing a raw material ester and an alcohol into contact with the solid acid catalyst of the present invention. The reaction temperature is a temperature at which the raw material ester is in a liquid phase and the alcohol is in a gaseous phase, and specifically 100° C. or more or particularly 150 to 350° C. is desirable. There are no particular limits on the reaction pressure, but a satisfactory reaction can be accomplished at an atmospheric pressure of about 0.5 to 2 atmospheres. There are also no limits on the reaction time, but sufficient product can be obtained in about 0.1 to 1 hour in a batch reaction or at a WHSV (weight hourly space velocity) of 0.5 to 5/hour in a flow system. A batch system or flow system may be used for the reaction system.

The raw material ester may have an ester compound as a principal component, or may be a polyhydric ester. In particular, a glyceride of a saturated or unsaturated fatty carboxylic acid having about 8 to 24 carbon atoms can be used by preference. Specifically, triglycerides which are known as fats and oils can be used by preference. Examples of such fats and oils include soy bean oil, coconut oil, olive oil, peanut oil, cottonseed oil, sesame seed oil, palm oil, castor oil and other vegetable oils as well as beef fat, pork fat, horse fat, whale oil, sardine oil, shark oil and other animal fats and oils. The raw material ester may contain 0 to 30% by weight or especially 1% to 20% by weight of free fatty acids. An alcohol with 1 to 3 carbon atoms, particularly methanol or ethanol, can be used favorably as the alcohol in the transesterification reaction, but a polyhydric alcohol is also acceptable.

Esterification Reaction

An esterification reaction is accomplished by bringing a raw material carboxylic acid and an alcohol into contact with the solid acid catalyst of the present invention. The reaction temperature is a temperature at which the raw material carboxylic acid is in a liquid phase and the alcohol is in a gaseous phase, and specifically 100° C. or more or particularly 150 to 350° C. is desirable. There are no particular limits on the reaction pressure, but a satisfactory reaction can be achieved at an atmospheric pressure of about 0.5 to 2 atmospheres. There are also no limits on the reaction time, but sufficient product can be obtained in about 0.1 to 1 hour in a batch reaction or at a WHSV (weight hourly space velocity) of 0.5 to 5/hour in a flow system. A batch system or flow system may be used for the reaction system.

The raw material carboxylic acid may be a component constituting natural or synthetic ester compounds, such as fats, and a polyhydric carboxylic acid may be used. In particular, a saturated or unsaturated fatty carboxylic acid having about 8 to 24 carbon atoms can be used by preference. Specifically, many can be prepared from triglycerides which are known as fats and oils. The alcohol used in the esterification reaction may be an alcohol with 1 to 3 carbon atoms, particularly methanol or ethanol, but a polyhydric alcohol is also acceptable.

EXAMPLES

The present invention is explained in detail below using examples.

Preparation of Sulfated Tin Oxide Catalyst MO-858

100 g of commercial stannic chloride (SnCl$_4$ nH$_2$O, produced by Wako Pure Chemicals) was dissolved in 3 L of water, and an ammonia water (25% concentration) was added dropwise to precipitate. The pH was 8. The filtered precipitate was dispersed in a 4% by weight aqueous ammonium acetate solution, filtered again and dried for 24 hours in air at 100° C. to obtain precursor 1.4 g of the resulting precursor 1 was contacted for 1 hour with 60 mL of 6N sulfuric acid, filtered, dried for 2 hours in air at 100° C., and calcined for 3 hours at 500° C. in air to obtain sulfated tin oxide catalyst 1 (hereunder called MO-858).

This MO-858 was a yellow powder with a specific surface area of 135 m$^2$/g, a pore size of 0.002 to 10 μm and a pore volume of 0.1 ml/g. Within the pore size range of 0.002 to 0.05 μm, the median pore size of MO-858 was 3.1 nm. The argon adsorption heat was −29.7 kJ/mol. The tin content was 71.4% by weight, the elemental sulfur content was 1.96% by weight, and the crystal structure was tetragonal with a crystallite size of 32 nm.

In the infrared reflection spectrum, reflectance was 52.8% at 1280 cm$^{-1}$ and 52.2% at 1220 cm$^{-1}$. In these specifications, the infrared reflection spectrum was obtained by mixing the sulfated tin oxide catalyst and KBr under stirring, compression molding the mixture into pellets, and measuring the surface reflection of the pellets by the diffuse reflection method. The measurement results are shown in FIG. 1. In the ultraviolet reflection spectrum, reflectance at 450 nm was about 65%. In these specifications, the ultraviolet reflection spectrum was measured by measuring reflection from the surface of a sulfated tin oxide catalyst sample which had been powdered and compression molded.

Preparation of Sulfated Tin Oxide MO-817

100 g of commercial metastannic acid (SnO$_2$, produced by Yamanaka Industries) was dispersed in a 4% by weight aqueous ammonium acetate solution, and filtered and dried for 24 hours in air at 100° C. to obtain precursor 2.4 g of the resulting precursor 2 was contacted for 1 hour with 60 mL of 6N sulfuric acid, filtered, dried for 2 hours in air at 100° C., and further calcined for 3 hours in air at 500° C. to obtain a sulfated tin oxide catalyst (hereunder called MO-817).

This MO-817 was a white powder with a specific surface area of 152 m$^2$/g, a pore size of 0.002 to 10 μm and a pore volume of 0.1 ml/g. Within the range of 0.002 to 0.05 μm, the median pore size of MO-817 was 2.8 nm. The argon adsorption heat was −31.0 kJ/mol. The tin content was 70.6% by weight, the elemental sulfur content was 2.44% by weight, and the crystal structure was tetragonal with a crystallite size of 35 nm.

Figure 2:
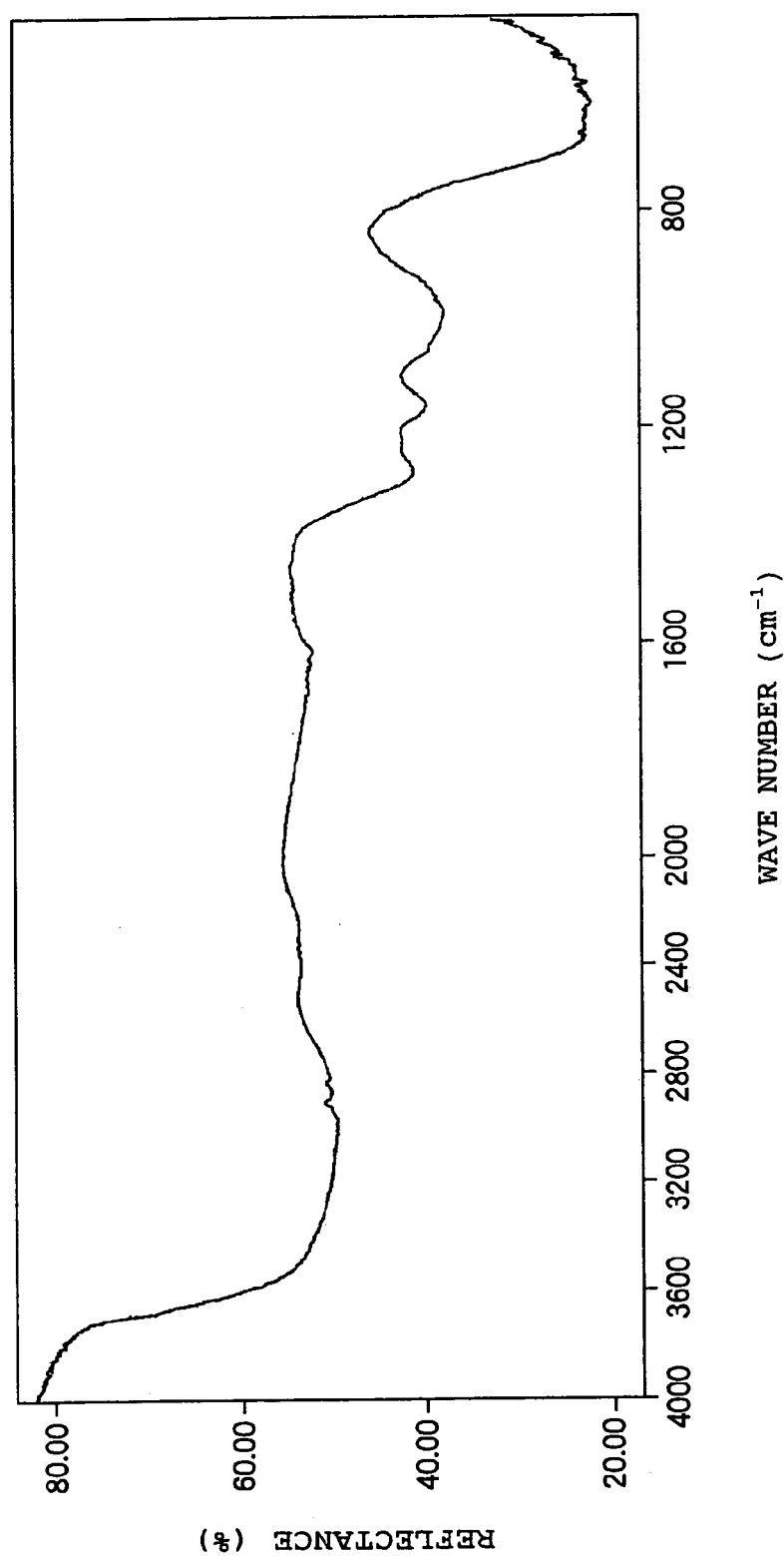
FIG. 2 shows the infrared reflection spectrum of the sulfated tin oxide catalyst MO-817.

In the infrared reflection spectrum, reflectance was 40.7% at 1280 cm$^{-1}$ and 42.0% at 1220 cm$^{-1}$. The measurement results are shown in FIG. 2. In the ultraviolet reflection spectrum, reflectance at 450 nm was 85%.

[Transesterification Reactions]

4 cm$^3$ of each of these catalysts was packed into a fixed-bed flow reactor with a length in the vertical direction of 50 cm and an inside diameter of 1 cm, soy bean oil (produced by Kanto Chemical) as the raw material ester and methanol as the alcohol were introduced from the upper end, and the conversion rate of soy bean oil at the lower outlet was measured by gas chromatography 4 and 20 hours after the start of the feed. The molar ratio of soy bean oil to methanol was 1:40. The results are shown in Table 1.

TABLE 1

|  | Experimental example | |
|---|---|---|
|  | 1 | 2 |
| Experimental number | 28-7 | 5-7 |
| Catalyst | MO-858 | MO-817 |
| Reaction temperature (° C.) | 200 | 200 |
| WHSV (1/hour) | 1.85 | 1.85 |
| Raw material flow rate (g/hour) |  |  |
| Soy bean oil | 3.0 | 3.0 |
| Methanol | 4.4 | 4.4 |
| Soy bean oil conversion rate (%) |  |  |
| After 4 hours | 16.0 | 69.0 |
| After 20 hours | 12.0 | 67.0 |

Esterification Reaction 4 cm3 of each of these catalysts was packed into a fixed-bed flow reactor with a length in the vertical direction of 50 cm and an inside diameter of 1 cm, octanoic acid as the raw material fatty acid (produced by Kanto Chemical) and methanol as the alcohol were introduced from the upper end, and the conversion rate of octanoic acid at the lower outlet was measured by gas chromatography 8 hours after the start of the feed. The molar ratio of octanoic acid to methanol was 1:4.5. The results are shown in Table 2.

TABLE 2

|  | Experimental example | | | |
|---|---|---|---|---|
|  | 3 | 4 | 5 | 6 |
| Catalyst | MO-858 | MO-817 | MO-858 | MO-817 |
| Reaction temperature (° C.) | 105 | 105 | 90 | 90 |
| WHSV (1/hour) | 1.5 | 1.5 | 1.5 | 1.5 |
| Raw material flow rate (g/hour) |  |  |  |  |
| Octanoic acid | 3.0 | 3.0 | 3.0 | 3.0 |
| Methanol | 3.0 | 3.0 | 3.0 | 3.0 |
| Octanoic acid conversion rate (%) after 8 hours | 97.7 | 99.3 | 93.4 | 94.6 |

In the transesterification and esterification reactions, a higher conversion rate was obtained using MO-817, which had an argon adsorption heat (which is an indicator of the acid strength of a superacid) of less than −30 kJ/mol, or an absolute value of argon adsorption heat of more than 30 kJ/mol.

INDUSTRIAL APPLICABILITY

With the present invention it is possible to prepare a sulfated tin oxide catalyst with stronger acid properties than before, and this sulfated tin oxide catalyst exhibits strong catalytic activity in acid-catalytic reactions. This is extremely useful industrially because it exhibits strong activity in transesterification reactions and other acid-catalytic reactions.

The invention claimed is:

1. A method for preparing a solid acid catalyst containing crystalline metastannic acid, comprising: preparing a support comprising a crystalline metastannic acid, bringing the support into contact with organic acid ions, then bringing the support into contact with a sulfate group-containing compound, and then calcining the support.

2. A solid acid catalyst obtained by the method of claim 1, the catalyst containing crystalline metastannic acid and having a tin content of not less than 30% by weight as metal in the catalyst, a sulfate group supported thereon and an absolute value of argon adsorption heat of 30 kJ/mol or more, which is used in acid-catalytic reactions.

3. The solid acid catalyst according to claim 2, wherein, in the infrared reflection spectrum of the catalyst, reflectance at 1280 cm$^{-1}$ is less than reflectance at 1220 cm$^{-1}$.

* * * * *